May 5, 1925.
H. D. TANNER
BEVEL GEAR TESTING DEVICE
Filed Nov. 18, 1921
1,536,734
2 Sheets-Sheet 2
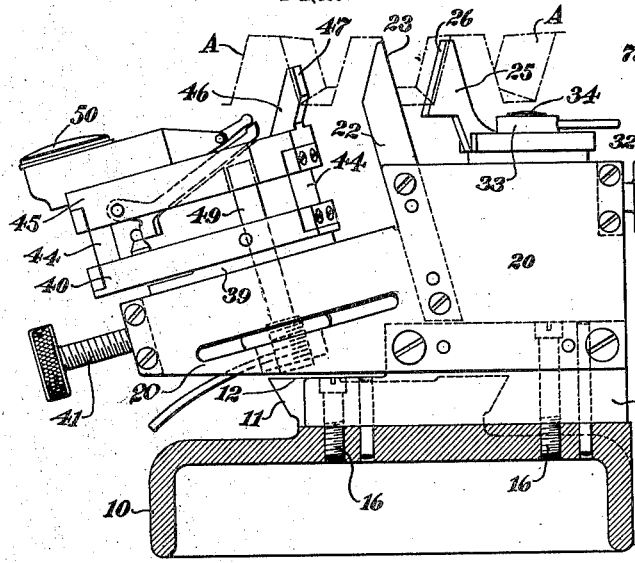

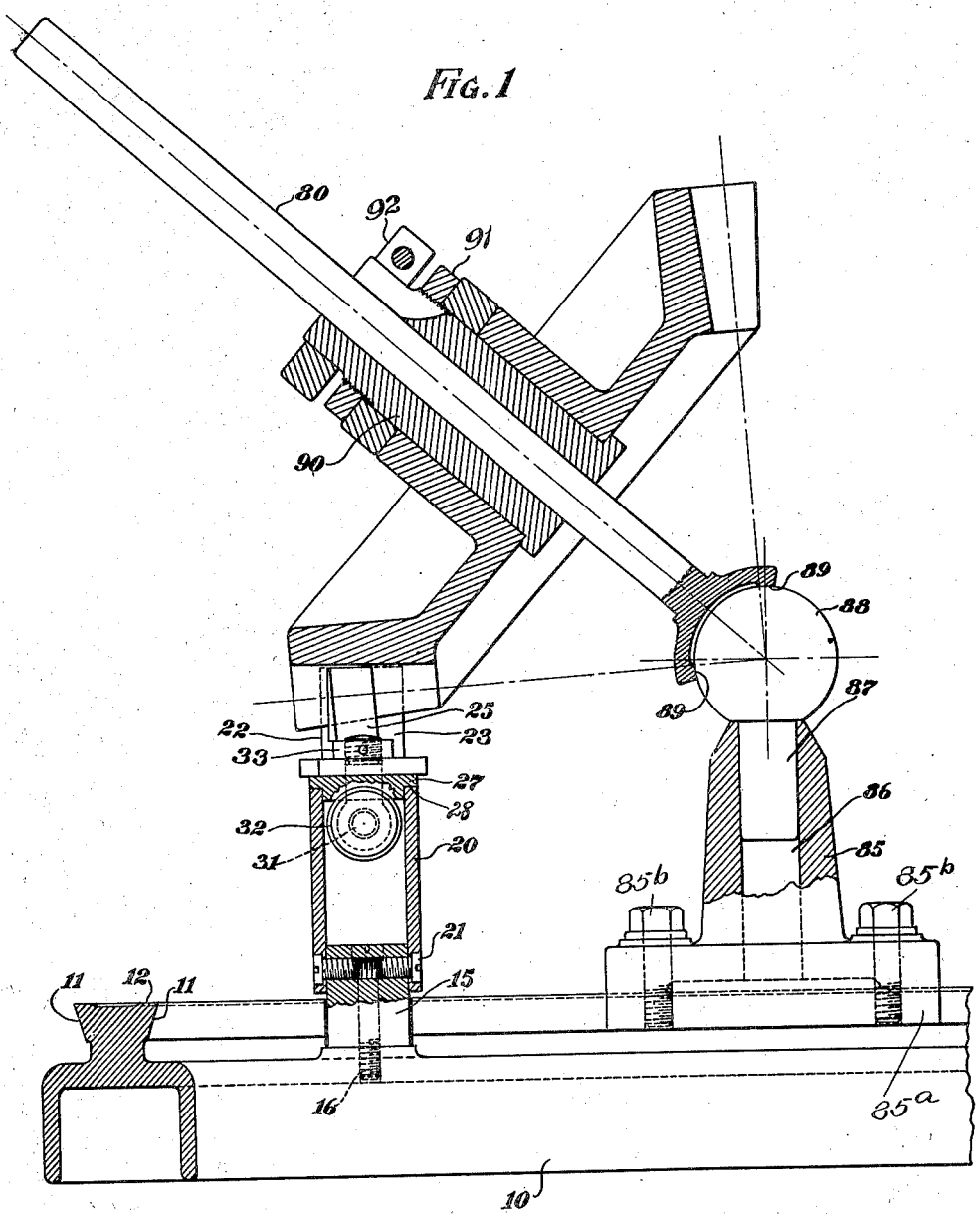

Patented May 5, 1925.

1,536,734

UNITED STATES PATENT OFFICE.

HUBERT D. TANNER, OF HARTFORD, CONNECTICUT, ASSIGNOR TO PRATT & WHITNEY COMPANY, OF NEW YORK, N. Y., A CORPORATION OF NEW JERSEY.

BEVEL-GEAR-TESTING DEVICE.

Application filed November 18, 1921. Serial No. 516,150.

*To all whom it may concern:*

Be it known that I, HUBERT D. TANNER, a citizen of the United States, and a resident of Hartford, in the county of Hartford and State of Connecticut, have invented certain new and useful Improvements in Bevel-Gear-Testing Devices, of which the following is a specification.

This invention relates to a method of and device for testing gears, and in particular to a method of and device primarily adapted for testing bevel gears in a simple, expeditious, and accurate manner.

An object of the present invention is to provide a device of the same general type and operating in substantially the same manner as the device shown in applicant's prior application No. 454,989, filed March 24, 1921, for testing spur and helical gears, the device being so mounted relative to a support for a bevel gear that the alignment, spacing, and contour of the teeth of the bevel gear may be readily tested by rolling the gear to be tested past the gaging members while the teeth of the gear are in contact therewith.

One feature which enables me to provide a convenient and simple form of bevel gear testing device is that the gear to be tested is mounted in such a way that it is permitted to move in any direction about the apex of its own pitch cone, the testing members being positioned relative to the support for the gear at its pitch cone so that they will contact with any desired portions of the tooth engaging portions of the gear teeth. The means provided for mounting the gear being tested thus permit bevel gears of any pitch cone angle to be tested so that the testing device is practically universal and may even be used for involute spur gears and also for crown gears.

Another feature which is advantageous is that the gaging members of the device which contact with the tooth surfaces of the gear being tested are adjustable over a wide range so that bevel gears having teeth of widely different sizes and shapes may be readily tested.

Another feature which is advantageous is that the form of these gear tooth gaging or contacting members is substantially similar to those used in the above mentioned prior application filed by applicant, provision being made for angular adjustment of some of these members in accordance with the angles subtended between corresponding sides of adjacent teeth so that these contacting members may be disposed angularly to engage corresponding sides of adjacent teeth.

Another object is to provide a method which may be conveniently carried out with the aid of the hereindescribed device and by means of which the spacing, alignment, and correctness of form of the tooth engaging portions of the bevel gear teeth may be quickly and accurately ascertained.

With these and other objects in view, my invention consists in the features of construction and operation set forth in the following specification and illustrated in the accompanying drawings.

In the accompanying drawings annexed hereto and forming a part of this specification, I have shown my invention embodied in a particular type of bevel gear testing device but it will be understood that the invention can be otherwise embodied and that the drawings are not to be construed as defining or limiting the scope of the invention, the claims appended to this specification being relied upon for that purpose.

In the drawings:

Figure 1 shows a side elevation in section of the complete machine with a gear mounted thereon in position for testing.

Fig. 2 shows an end elevation of the machine without the gear being tested in position.

Fig. 3 is an end view of the device, parts being shown in section and adjusted for a different size of gear teeth.

Fig. 4 is a detail view of means employed in connection with the device for positioning the gear on its support so that it may be moved about the apex of its pitch cone and with its teeth in alignment with elements of said pitch cone.

Fig. 5 is another view of the same.

Fig. 6 is a plan view of this part of the invention.

In the above mentioned drawings, I have shown but one embodiment of the invention which is now deemed preferable but it is to be understood that changes and modifications may be made within the scope of the appended claims without departing from the spirit of the invention.

Briefly, my invention in its broadest aspect comprises the following principal parts; first, a base; second, a gear positioning member adjustably mounted thereon and preferably having a spherical top; third, a member mounted on the base having tooth contacting members, this part being analogous to the device described in applicant's above mentioned application; fourth, a bar, or other support, on which a gear to be tested may be adjustably mounted, adapted to engage the spherical portion of the positioning member so that the axis of the bar and the axis of the pitch cone of the gear may be in alignment with the center of the sphere; and fifth, a device for properly positioning the gear on its bar comprising an arm adapted to be mounted on a spherical member and having plane surfaces which, if extended, would pass through the center of the sphere.

Referring more in detail to the figures of the drawings, at 10 is shown an elongated base having its upper surface provided with dovetailed surfaces 11, the top surface 12 and one of the bevelled or dovetailed surfaces 11 of this base 10 being finished to perfect planes so that alignment of the parts will be preserved during their entire range of movement. Centrally disposed along this base 10 is a member 15 secured to the base 10 in any preferred manner as by means of screws 16 on which the tooth engaging parts of the device may be mounted. These parts comprise a frame 20 preferably permanently secured to the member 15 by means of screws 21 and other parts presently to be referred to.

Referring now to the tooth engaging members mounted on the frame 20 and particularly to Figs. 2 and 3, a member 22 is permanently secured to the frame 20, this member preferably being disposed so that its surface 23, which is plane, will be oblique to the surface 12 of the base. As shown, this member 22 makes an angle of approximately 15° to the line drawn normal to the surface 12 of the base. Mounted to move toward and from the member 22 is a member 25. This has a surface 26 which is oppositely disposed relative to surface 23 and is also disposed approximately 15° to a plane normal to the surface 12. The member 25 is rotatably carried by a small saddle or carriage 27 adapted to slide upon the upper surfaces 28 of the frame 20, these surfaces 28, as shown in Fig. 1, comprising the upper surface of the side members of frame 20. A central stud 29 extends through the carriage 27 and member 25 and at its lower portion has a threaded hole 30 through which passes an adjusting screw 31. By turning head 32 of screw 31, the carriage 27 and the member 25 may be positioned at any desired distance from the surface 23 of member 22. A clamping nut 33 engages the upper threaded end 34 of the stud 29 so that the carriage 27 may be clamped in any desired adjusted position along surfaces 28. As shown in Fig. 3, the clamp 33 also binds the member 25 in fixed angular position on the carriage 27. This member 25 when the clamping nut 33 is loosened is adapted to be turned to any angular position relative to the carriage 27 so that its surface 26 may contact with one of the flanks of the gear being tested. The function of the member 25 is to hold the surface 23 of member 22 and a gear tooth in such relative positions that they will have continuous contact while the gear is rolled about the apex of its pitch cone upon the device 20.

On the opposite side of the member 22 is a movable carriage 40 the position of which relative to the member 22 may be adjusted by screw 41 and rigidly clamped in position by locking nut 42. In this way, the member 40 may be positioned along the upper surfaces 43 of this part of the frame 20 toward or from the member 22. Preferably the carriage 40 is made in two parts. A member 39 disposed just below the carriage 40 is in contact with and moves along the surfaces 43 of the frame 20. Carriage 40 rests upon and may be adjusted angularly relative to carriage 39. Preferably the pivot for carriage 40 comprises the clamping bolt 49 suitably pinned to carriage 40. By means of this construction, the carriage 40 may be disposed at any desired angle relative to the carriage 39 and the surface 47 which, as shown in Fig. 2, is semi-cylindrical and may contact with a tooth flank disposed at any angle to that engaged by surface 23 of member 22. A clamping nut 42 engages the lower threaded end of bolt 49 which bears against a strap 42ª extending through slits in the frame 20. Secured in positions normal to the carriage 40 is a pair of thin flexible and resilient metal sheets 44. These, as shown in Fig. 3, are secured near the opposite ends of the carriage 40. Clamped to the upper portions of these flexible strips or sheets 44 is a member 45. From the above description, it will be obvious that member 45 may be moved relative to the carriage 40 and in so moving will always be maintained parallel to the carriage 40. Member 45 has a projection 46 on its end adjacent member 22. This projection 46 has a small contacting surface 47 lapped or otherwise finished so that its elements lie absolutely parallel to the contacting surface 23 which, as above stated, is preferably plane. This surface 47 is preferably semi-cylindrical as shown. As this device is primarily adapted for use in connection with bevel gears, the sizes of the teeth of the gear being tested forming oblique angles to each other, this surface 47 is preferably narrow as shown in Fig. 2. The position of surface 47 is clearly shown in Fig. 2. This is shown in its relation to the surfaces of a crown gear conjugate to the gear being tested, a few teeth of such a gear being indicated in the dotted outline A. As shown, an element of surface 47 lies directly in the plane occupied by the flank of a crown gear tooth, and surface 23 lies in the plane of the corresponding side of an adjacent tooth.

To limit the movement of the member 45 relative to the carriage 40, during operation the end of clamping screw 49 is extended to and enters a hole 48 provided in the member 45. This hole 48 is made slightly larger than the diameter of the clamping rod 49. This difference in diameters of the hole and rod limits the amount of movement of the member 45 relative to the member 40. Mounted on member 45 is a small dial indicator 50, the pointer of which may be deflected by the linkage shown in Figs. 2 and 3 to indicate movement of member 45 relative to carriage 40. A pin 55 set into the carriage 40 is pressed against by a lever 56 one end of this lever 56 being pivotally mounted at 57 in the member 45. The opposite extended end of the lever 57 bears against the operating lever 58 of the dial indicator. The leverage is such that a very slight movement of the member 45 relative to the carriage 40 is indicated on a greatly enlarged scale by the deflection of the pointer of dial indicator 50.

Before testing a gear by means of the above described device it is obvious that the gear must be mounted on an arbor in such a position that the arbor may be swung about in such a way that the gear may in effect be rolled around the apex of its pitch cone. As is well known in generated bevel gear, all elements of the tooth flanks having teeth of the well known "octoid" form converge at the apex of the pitch cone of the gear, and, if these elements do not converge at the apex of the pitch cone, the bevel gear teeth will not intermesh properly with the flanks of a correctly generated corresponding mating gear.

To position the gear on its arbor so that it may be swung about the apex of its pitch cone, I therefore mount an arm 75 on a spherical member. This is shown in Fig. 4 in which the arm 75 may be rigidly mounted on this spherical support 76 by means of a rivet passing through the arm and the spherical member. The arm is provided with plane surfaces 77 and 78 disposed obliquely to each other and passing through the center of the sphere 76 in any position to which the arm 75 is moved. By placing the gear to be tested on its arbor or support 80, which is in the form of a rod or bar it may be adjusted thereon toward or from the sphere 76 until it has reached a position where the opposite sides of adjacent teeth engage the edges between plane surfaces 77, 78 and 79 of the arm 75 throughout their length. This line contact may be readily determined by sighting along the rod 75 and the gear tooth in contact therewith and any deviation from true alignment between the bevel tooth and the edges of these plane surfaces on the arm 75 may be at once detected. Should the flanks of the teeth being tested fail to contact throughout their length with these edges in any position of the gear on its support 80, an error in alignment of the gear teeth will be at once apparent. With the gear on the rod 80 adjusted so that its tooth flanks are in alignment with the edges of surfaces 77, 78 and 79, it is in correct position for use in the testing device.

During the testing of the gear, a spherical member corresponding to, that is, of the same diameter as sphere 76 must be provided about which the gear may be moved. The support for holding the gear in position to be tested comprises an adjustable bracket or post 85 adapted to be clamped in any adjusted position along the ways 11 of the base 10. As shown in Fig. 1 the post 85 may have a clamping strip 85$^a$ engaging under one side of the projection 11. Clamping screws 85$^b$ permit this strip to be loosened so that the post 85 may be adjusted along the base 10. This permits adjustment of the post 85 so that the gear may be placed on its support 80 and swung about the apex of its pitch cone with portions of its teeth in contact with members 22, 25 and 46. This member 85 is provided with a vertical bearing 86 in which a member 87 is adapted to be fitted having a spherical end 88 disposed at the top of the post 86. The center of this sphere is also disposed in such a position that its center will be approximately the same distance above the surface 12 as the upper edges of the tooth engaging members 22 and 25. The surface 23 which, as above stated, is plane is in alignment with the center of sphere 88. Similarly, when the members 25 and 46 have been adjusted to operative position so that surfaces 26 and 47 are in their correct positions, these surfaces are also in alignment with the center of sphere 88. The rod 80 forming the arbor on which the gear to be tested is mounted has concave portions 89 at one end corresponding with the spherical surface 88. The rod 80 may thus be held manually in such a position that its concave end 89 may contact with the sphere 88. This bar 80 is provided with a suitable bushing 90 adapted to fit the gear to be tested and which may be secured on the bushing 90 by the nut 91 on the bushing. The bushing 90 may then be clamped to the bar 80 by clamp 92 in such a position that the apex of the pitch cone of the gear being tested coincides with the center of sphere 88, and the teeth of the gear are in position to contact with the members 22, 25 and 46 when the gear is rolled past them.

Coming now to a description of the method of operation of the device, the gear to be tested is first properly located on its supporting rod 80 by means of the arm 75 in the manner above indicated. Next the post 85 with the sphere 88 is positioned on base 10 so that the gear being tested will contact with members on member 20. The member 25 is then adjusted so that one tooth of the gear being tested may fit between the surfaces 23 and 26 and the carriage 27 together with the member 25 is clamped in position with the surface 26 of member 25 angularly disposed to surface 23 in accordance with the angle between opposite sides of a tooth. Member 25 will therefore hold surface 23 against a portion of the tooth flank of a single tooth on the gear being tested. The carriage 40 is then adjusted and clamped so the surface 47 will contact with a portion of a flank of an adjacent tooth corresponding to the flank engaged by surface 23. The carriage 40 is then clamped in angularly adjusted position and the dial indicator 50 adjusted. The gear being tested, which as above stated, has previously been mounted on the bar 80 in such a position that the apex of its pitch cone coincides with the center of the sphere 88 is then placed in position as shown in Fig. 1 and, holding the end of the bar 80 on the sphere 88 the gear is moved slightly thus simulating a rolling action so that the surface 47 will contact with the gear on a part of the tooth engaging portion of a tooth while the surface 23 is in contact with an adjacent corresponding tooth engaging surface. During this rolling movement of the gear, the variations of the pointer on dial indicator 50 are noted which indicate errors in the contour and spacing of the tooth flanks.

By keeping a record of the dial readings obtained while testing a gear and while testing its mating gear with the parts of the device in exactly the same positions of adjustments information is obtained from which the running qualities of that pair of gears may be deduced. If the average readings of the indicator dial 50 for both gears with the parts in the same positions are identical the gears are conjugate to each other and will have proper intermeshing relation.

To test the opposite sides of gears it is only necessary to change the position of the post 85 and sphere 88 from one side to the other of the parts mounted on member 20.

By means of the adjustments of the different parts of the device a wide range of sizes of bevel gears may be examined of any angle of pitch cone. The movement of the gear being tested while in contact with the members 25, 22 and 46 simulates the rolling action of a bevel gear around a conjugate crown gear, this action as is well known being the equivalent of a cone rolling about a point in a plane.

What I claim is:

1. A device for testing bevel gears comprising in combination, means to support a gear so that it may be moved about the apex of its pitch cone, a member having a surface adapted to contact with the surface of one of the teeth of said gear, means holding said gear against said surface, a movable member adapted to contact with the corresponding surface of an adjacent tooth, and means to indicate the amount of movement of said movable member as said gear is rolled upon said members.

2. A device for testing bevel gears comprising in combination, means to support a gear so that it may be moved about the apex of its pitch cone, a member having a surface adapted to contact with the surface of one of the teeth of said gear, means holding said tooth against said surface, a movable member adapted to contact with the corresponding surface of an adjacent tooth, means to adjust the position of said movable member for different sizes of teeth, and means to indicate the amount of movement of said movable member as said gear is rolled upon said members.

3. A device for testing bevel gears comprising in combination, means to support a gear so that it may be moved about the apex of its pitch cone, a member having a surface adapted to contact with the surface of one of the teeth of said gear, means holding said tooth against said surface, an angularly adjustable movable member adapted to contact with a corresponding surface of an adjacent tooth, and means to indicate the amount of movement of said latter member as said gear is rolled upon said members.

4. A device for testing bevel gears comprising in combination, means to support a gear so that it may be moved about the apex of its pitch cone, a member having a surface adapted to contact with the surface of one of the teeth of said gear, means holding said tooth against said surface, a movable member having a plane surface adapted to contact with a corresponding surface of an adjacent tooth, and means to indicate the amount of movement of said latter member as said gear is rolled upon said members.

5. A device for testing bevel gears comprising in combination, means to support a gear so that it may be moved about the apex of its pitch cone, a member having a plane surface adapted to contact with the surface of one of the teeth of said gear, means holding said tooth against said surface, a movable member adapted to contact with a corresponding surface of an adjacent tooth, and means to indicate the amount of movement of said latter member as said gear is rolled upon said members.

6. A device for testing bevel gears comprising in combination, means to support a gear so that it may be moved about the apex of its pitch cone, a member having a surface adapted to contact with the surface of one of the teeth of said gear upon one of its elements, means holding said tooth against said surface, a movable member adapted to contact with a corresponding surface of an adjacent tooth, and means to indicate the amount of movement of said latter member as said gear is rolled upon said members.

7. A device for testing bevel gears comprising in combination, means to support a gear so that it may be moved about the apex of its pitch cone, a member having a surface adapted to contact with the surface of one of the teeth of said gear upon one of its elements, means holding said tooth against said surface, a movable member having a narrow plane surface adapted to contact with a corresponding surface of an adjacent tooth, and means to indicate the amount of movement of said latter member as said gear is rolled upon said members.

8. A device for testing bevel gears comprising in combination, means to support a gear so that it may be moved about the apex of its pitch cone, a member having a surface adapted to contact with the surface of one of the teeth of said gear, means holding said tooth against said surface, a movable member having a surface adapted to contact with a corresponding surface of an adjacent tooth, said surfaces when in operative position having elements in alignment with the apex of the pitch cone of the gear being tested, and means to indicate movement of said latter member as said gear is rolled upon said members.

9. A device for testing bevel gears comprising in combination, a base, a device provided with adjustable gear tooth contacting members mounted thereon, a member having a spherical portion slidably mounted on said base, a rod adapted to mount the gear to be tested, and means on said rod adapted to engage said sphere so that said gear may be moved about the apex of its pitch cone and be manually held in engagement with said contact members along adjacent teeth.

10. A device for testing bevel gears comprising in combination, a base, a device provided with adjustable gear tooth contacting members mounted thereon, a member having a spherical portion slidably mounted on said base, a rod adapted to mount the gear to be tested, means on said rod adapted to engage said sphere so that said gear may be moved about the apex of its pitch cone and be manually held in engagement with said contact members along adjacent teeth, and means permitting adjustment of said contact members to accommodate different sizes of gear teeth.

11. The method of testing bevel gears comprising mounting the gear to be tested so that it may be moved about the apex of its pitch cone, rolling said gear relative to contact members adapted to engage corresponding sides of adjacent gear teeth, and noting variations in the distance between said contact members during said rolling movement of said gear.

12. The method of testing bevel gears comprising mounting the gear to be tested so that it may be moved about the apex of its pitch cone, rolling said gear about its pitch cone relative to tooth contacting members disposed in alignment with tooth surfaces of a conjugate crown gear, and noting variations in the distance between said contact members during said rolling movement of said gear.

13. The method of testing bevel gears comprising mounting the gear to be tested so that it may be moved about the apex of its pitch cone, rolling said gear about its pitch cone relative to tooth contacting members adapted to engage corresponding sides of adjacent gear teeth along elements thereof, and noting variations in the normal distance between said contact members during said rolling movement of said gear.

14. The method of testing bevel gears comprising mounting the gear to be tested so that it may be moved about the apex of its pitch cone, rolling said gear about its pitch cone relative to tooth contacting members having plane sides adapted to engage the teeth of said gear upon octoidal surfaces of adjacent gear teeth, and noting variations in the normal distance between said contact members during said rolling movement of said gear.

15. The method of testing bevel gears comprising mounting the gear to be tested so that it may be moved about the apex of its pitch cone, rolling said gear relative to contact members adapted to engage corresponding sides of adjacent gear teeth, noting variations in the distance between said contact members during said rolling movement of the gear, and repeating the operation with different gear teeth in engagement with the contact members.

16. The method of testing bevel gears comprising mounting the gear to be tested so that it may be moved about the apex of its pitch cone, rolling said gear about its pitch cone relative to tooth contacting members adapted to engage corresponding sides of adjacent gear teeth along elements thereof, noting variations in the normal distance between said contact members during said rolling movement of said gear, and repeating the operation with different gear teeth in engagement with the contact members.

17. The method of testing bevel gears comprising mounting the gear to be tested so that it may be moved about the apex of its pitch cone, rolling said gear about its pitch cone relative to tooth contacting members having plane sides adapted to engage the teeth of said gear upon octoidal surfaces of adjacent gear teeth, noting variations in the normal distance between said contact members during said rolling movement of said gear, and repeating the operation with different gear teeth in engagement with the contact members.

In testimony whereof, I hereto affix my signature.

HUBERT D. TANNER.